United States Patent
Li

(10) Patent No.: US 11,281,809 B2
(45) Date of Patent: Mar. 22, 2022

(54) SECURITY DISPLAY METHOD AND DEVICE, AND SECURITY TERMINAL

(71) Applicant: TENDYRON CORPORATION, Beijing (CN)

(72) Inventor: Dongsheng Li, Beijing (CN)

(73) Assignee: Tendyron Corporation, Beijing (CN)

( * ) Notice: Subject to any disclaimer, the term of this patent is extended or adjusted under 35 U.S.C. 154(b) by 42 days.

(21) Appl. No.: 16/643,468

(22) PCT Filed: Jul. 10, 2018

(86) PCT No.: PCT/CN2018/095185
§ 371 (c)(1),
(2) Date: Feb. 28, 2020

(87) PCT Pub. No.: WO2019/042022
PCT Pub. Date: Mar. 7, 2019

(65) Prior Publication Data
US 2020/0364376 A1    Nov. 19, 2020

(30) Foreign Application Priority Data

Aug. 28, 2017 (CN) .......................... 201710749954.6
Aug. 28, 2017 (CN) .......................... 201710760189.8

(51) Int. Cl.
*G06F 21/74* (2013.01)
*G06F 21/55* (2013.01)
(Continued)

(52) U.S. Cl.
CPC ............ *G06F 21/74* (2013.01); *G06F 21/556* (2013.01); *G06F 21/561* (2013.01); *G06F 21/84* (2013.01)

(58) Field of Classification Search
CPC ...... G06F 21/74; G06F 21/561; G06F 21/556; G06F 21/84
See application file for complete search history.

(56) References Cited

U.S. PATENT DOCUMENTS 9,043,900 B1 * 5/2015 Kim ........................ G06F 21/00
 726/19
9,135,763 B2 * 9/2015 Gupta ...................... G07C 9/37
(Continued)

FOREIGN PATENT DOCUMENTS

CN    203151519 U    8/2013
CN    103530181 A    1/2014
(Continued)

OTHER PUBLICATIONS

International Search Report dated Sep. 28, 2018 for PCT/CN2018/095185 with English translation.
(Continued)

*Primary Examiner* — Viral S Lakhia
(74) *Attorney, Agent, or Firm* — Martin & Ferraro, LLP

(57) ABSTRACT

The present disclosure provides a security display method, a security display device, and a security terminal. The security display method includes the following. In a security display control state, first information to be displayed currently is obtained. It is determined whether the first information to be displayed includes a specified identifier. In response to the first information to be displayed includes the specified identifier, the security processing information is obtained by filtering the first information to be displayed based on the specified identifier, and the security processing information is securely processed. The security processing information is displayed at a security display address. The security display address is a preset fixed display address. Or, a security identifier is added to the security processing information to obtain security display information and the security display information is displayed.

15 Claims, 4 Drawing Sheets

(51) Int. Cl.
    *G06F 21/56*     (2013.01)
    *G06F 21/84*     (2013.01)

(56) References Cited

U.S. PATENT DOCUMENTS

| | | | |
|---|---|---|---|
| 9,310,926 B2* | 4/2016 | Chung | G06F 3/0488 |
| 9,600,691 B2* | 3/2017 | Heo | G06F 21/606 |
| 9,773,131 B2* | 9/2017 | Matsumoto | G06Q 20/18 |
| 10,499,248 B2* | 12/2019 | Li | G06F 12/14 |
| 10,657,235 B2* | 5/2020 | Yang | G06F 21/31 |
| 10,706,171 B2* | 7/2020 | Silva Pinto | G06F 21/74 |
| 11,074,372 B2* | 7/2021 | Bolignano | G06F 21/36 |
| 2014/0325679 A1 | 10/2014 | Heo | |
| 2017/0164201 A1* | 6/2017 | Li | G06F 21/62 |
| 2017/0346851 A1* | 11/2017 | Drake | H04L 63/0428 |
| 2017/0351865 A1* | 12/2017 | Elnekaveh | G06F 3/04842 |
| 2018/0357418 A1* | 12/2018 | Li | G06F 21/57 |

FOREIGN PATENT DOCUMENTS

| | | |
|---|---|---|
| CN | 105975853 A | 9/2016 |
| CN | 106453052 A | 2/2017 |

OTHER PUBLICATIONS

Written Opinion of the International Search Authority dated Sep. 28, 2018 for PCT/CN2018/095185 with English Translation.

* cited by examiner

SECURITY DISPLAY METHOD AND DEVICE, AND SECURITY TERMINAL

CROSS-REFERENCE TO RELATED APPLICATIONS

This application is a US national application of PCT Application No. PCT/CN2018/095185, filed on Jul. 10, 2018, which claims priority to and benefits of Chinese Patent Application No. 201710749954.6 filed on Aug. 28, 2017 and Chinese Patent Application No. 201710760189.8 filed on Aug. 28, 2017, all of which are filed by TENDYRON CORPORATION, and the entire contents of which are incorporated herein by reference.

FIELD

The present invention relates to a field of display, and more particularly, to a security display method and device, and a security terminal.

BACKGROUND

At present, a terminal device (for example, a computer, a smart phone, and the like) is widely used in daily life of people. The terminal device may be easily controlled by programs such as Trojans. In a transaction process, the Trojans may tamper transaction information to be confirmed by a user, and control a display screen to display original transaction information. As a result, the user may consider the transaction information to be correct to confirm the transaction information. However, the transaction information which is tampered is the tampered transaction information, leading to an illegal transaction and causing a loss of the user. Therefore, how to ensure a display security on the terminal device and to ensure the security of the transaction, becomes a problem to be solved urgently.

SUMMARY

The present disclosure provides a security display method. The security display method includes, entering a security display control state; obtaining first information to be displayed currently; determining whether the first information to be displayed includes a specified identifier; in response to the first information to be displayed includes the specified identifier, obtaining security processing information by filtering the first information to be displayed based on the specified identifier, and securely processing the security processing information; controlling to display the security processing information at a security display address, in which the security display address is a preset fixed display address, or adding a security identifier to the security processing information to obtain security display information and controlling to display the security display information.

The present disclosure further provides a security terminal. The security terminal includes one or more processors, a memory, and one or more programs, stored in the memory. When the one or more programs are executed by the one or more processors, the one or more processors is configured to execute a security display method. The security display method includes: entering a security display control state; obtaining first information to be displayed currently; determining whether the first information to be displayed includes a specified identifier; in response to the first information to be displayed includes the specified identifier, obtaining security processing information by filtering the first information to be displayed based on the specified identifier, and securely processing the security processing information; and controlling to display the security processing information at a security display address, in which the security display address is a preset fixed display address; or, adding a specified identifier to the security processing information to obtain security display information and controlling to display the security display information.

DETAILED DESCRIPTION

Embodiments of the present invention will be described in further detail below with reference to accompanying drawings.

Figure 1:
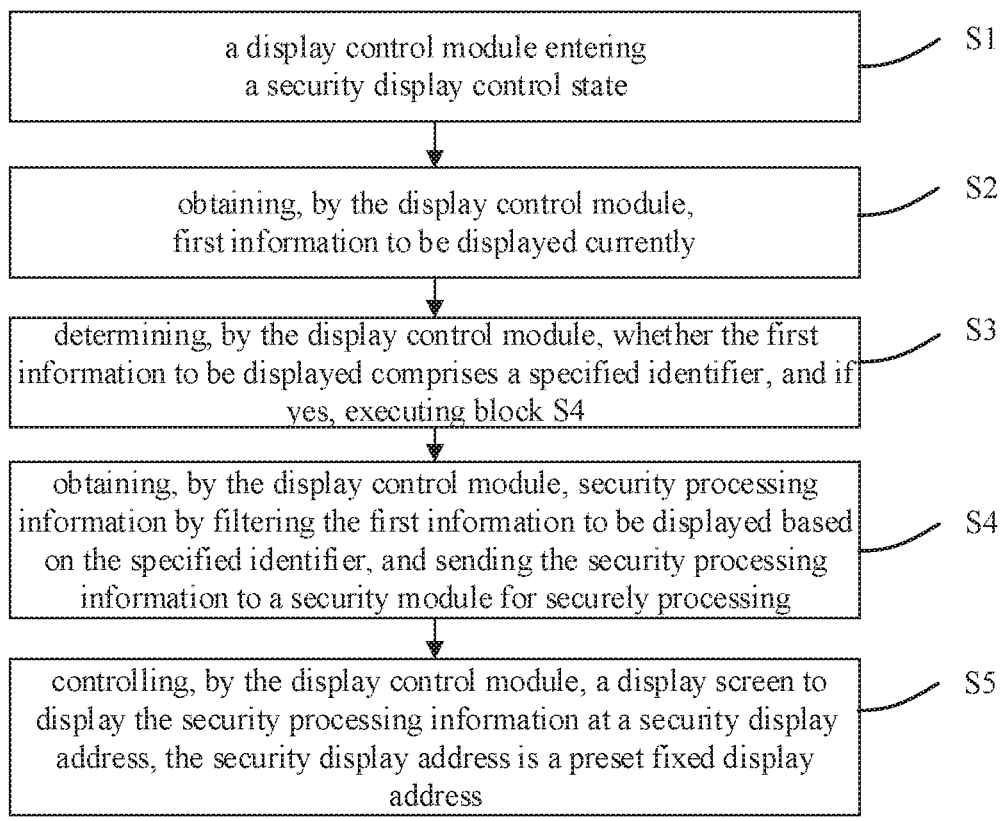
FIG. 1 is a flow chart illustrating a security display method according to embodiments of the present invention.

Embodiments of the present disclosure may provide a security display method. As illustrated in FIG. 1, the security display method according to embodiments may mainly include the following (blocks S1-S5).

At block S1: a display control module enters a security display control state.

In embodiments, the display control module may have a state control function, and may switch among states based on a trigger of an instruction. The display control module may be integrated to a terminal, to ensure the terminal secure. The display control module may be a separated and secure chip, and all operations of this chip may be controlled by itself without being controlled by an external control chip (e.g., a central processing unit of the terminal), to guarantee security of the operations of the display control module. In a case that the display control module is in the security display control state, after the display control module receives information to be displayed, the information to be displayed is not directly sent to the display screen for displaying, but a series of judgement and processing (see blocks S2-S5) are performed on the information to be displayed, to determine a display manner based on the type and the timing of the received information to be displayed. Compared with the security display control state of the display control module, a non-security display control state of the display control module may be referred to as a general state. In a case that the display control module is in the general state, the display control module may control the display screen to directly display the information to be displayed after receiving the information to be displayed. In detailed implementations, in order to implement different display functions of the display control module in different states, a switch may be set in the display control module. In a case that the display control module is in the general state, the switch may be controlled to be in a first switching state. In this case, the display control module only has a forwarding function and directly forwards the received data to be displayed to the display screen for displaying. In a case that the display control module is in the security display control state, the switch may be controlled to be in a second switching state. In this case, after the display control module receives the data to be displayed, operations of blocks S2-S5 may be performed.

As a possible implementation of embodiments of the present application, in order to trigger the display control module to enter the security display control state, before the block S1, the method according to embodiments may further include a block S0. The block S0 may include: receiving, by the display control module, a first instruction sent by a central processing unit; determining whether the first instruction is included in a security instruction set, and in a case that the first instruction is included in the security instruction set, performing the block S1. The security instruction set may include all instructions for triggering to enter the security display state. With the above implementations, the display control module may be controlled to enter the security display control state by sending any instruction included in the security instruction set in a case of requiring to securely display.

In embodiments, the central processing unit (CPU) may be a core component in the terminal for operation and control. The CPU may also be configured to exchange information with an external device. The security instruction set may include, in principle, all instructions in all instruction streams received by the display control module before the display screen displays the information to be securely displayed. In detailed implementations, the instructions included in the security instruction set may be determined as required. The security instruction set may be stored in a memory of the display control module. Since the memory of the display control module cannot be accessed by an external device, the security instruction set may be prevented from being tampered, thereby ensuring security of the security instruction set.

In detailed implementations, an instruction tag of the instruction for triggering to enter the security display state may be stored in the security instruction set. The instruction tag may be represented by data having a length of a specific bit from a specific position in the instruction. For example, the instruction tag may be represented by the data having the length of 1 bit starting from the second bit in the instruction. In this case, the instruction tag with the length of 1 bit may mark 256 different instructions. Since data volume of the instruction tag is small, a storage space of the security instruction set may be saved. After the first instruction sent by the central processing unit is received by the display control module, the instruction tag of the first instruction may be compared with instruction tag stored in the security instruction set. The comparison may be stopped and the display control module is triggered to enter the security display control state, when the instruction tag of the first instruction is matched with any instruction tag included in the security instruction set. Otherwise, when the instruction tag of the first instruction is not matched with any instruction tag included in the security instruction set the comparison is continued until the instruction tag of the first instruction is compared with all instruction tags stored in the security instruction set, and it may be determined that the first instruction is not included in the security instruction set. In detail, the display control module may compare the instruction tag of the first instruction with the instruction tags included in the security instruction set one by one.

At block S2, the display control module obtains first information to be displayed currently.

In embodiments, the display control module may obtain the first information to be displayed from a control instruction received. The control instruction carrying the first information to be displayed and the instruction for triggering the display control module to enter the security display control state may be a same instruction or may be different instructions. In detailed implementations, based on a determination whether the control instruction and the instruction for triggering the display control module to enter the security display control state are the same instruction, the display control module may obtain the first information to be displayed currently in different ways. For example, two ways may be described below.

In a first way, the instruction for triggering the display control module to enter the security display control state is different from the control instruction carrying the first information to be displayed currently. In this way, the security instruction set may include an application initialization instruction or an instruction for preparing security computing environment, and the first instruction may include the application initialization instruction or the instruction for preparing security computing environment. The application initialization instruction or the instruction for preparing security computing environment may be used to trigger the display control module to enter the security display control state. The block S2 may include: receiving, by the display control module, the control instruction carrying the first information to be displayed, and obtaining the first information to be displayed carried in the control instruction.

In embodiments, the display control module is triggered to enter the security display control state by the application initialization instruction or the instruction for preparing security computing environment. After the display control module enters the security display control state, in a case that the control instruction carrying the first information to be displayed currently is received, the first information to be displayed is obtained from the control instruction.

In a second way, the instruction for triggering the display control module to enter the security display control state and the control instruction carrying the first information to be displayed currently are the same instruction. That is, in implementations, when the display control module receives a special control instruction for displaying, the display control module enters the security display control state. In this way, the security instruction set may include a signature instruction and a first instruction may include the signature instruction. That is, the signature instruction may be used to trigger the display control module to enter the security display control state. The block S2 may include: obtaining, by the display control module, the first information to be displayed carried in the signature instruction.

In implementations, the display control module may be triggered by the signature instruction to enter the security display control state. Since the signature instruction carries the first information to be displayed currently, the display control module may be configured to directly obtain the first information to be displayed from the signature instruction after entering the security display control state.

At block S3, the display control module determines whether the first information to be displayed includes a specified identifier. If yes, a blocks S4 is executed.

In embodiments, the specified identifier may be an identifier that is negotiated in advance by the display control module and a device that generates the first information to be displayed. For example, the identifier is a keyword or has a fixed format. The specified identifier may be used to distinguish special information which needs to be securely processed by the security module from other information of the first information to be displayed. In a case that the first information to be displayed does not include the specified identifier, it indicates that the first information to be displayed does not include the special information which needs to be securely processed by the security module. Therefore, all of the first information to be displayed may be directly displayed, such that the display control module may control the display screen to directly display the first information to be displayed. In a case that the first information to be displayed includes the specified identifier, it indicates that the first information to be displayed includes the information which needs to be securely displayed.

At block S4, the display control module obtains security processing information by filtering the first information to be displayed based on the specified identifier, and sends the security processing information to a security module for securely processing.

In embodiments, the security processing information may be key information in a transaction. The security module is a trusted module that may ensure security of operations performed by the security module. The security module may be configured to store information such as a key and a certificate, and the memory of the security module may refuse access by other modules than the security module, such that security of the stored information such as the key and the certificate may be ensured. The security processing performed by the security module may include encryption, decryption, signature, verification and the like. Preferably, the security processing may be the signature operation. Besides the security processing information, the first information to be displayed may also include information which may be directly displayed on a display screen.

In detailed implementations, the display control module may include a single output path after the filtering based on the specified identifier. In this case, the single output path may be used to output the security processing information, and other information except the security processing information in the first information to be displayed may be discarded in the filtering process. The display control module may have two output paths after the filtering based on the specified identifier. One is configured to output the security processing information, and the other one is configured to output other information except the security processing information in the first information to be displayed. In this case, neither the security processing information nor the other information in the first information to be displayed is discarded.

At block S5, the display control module controls the display screen to display the security processing information at a security display address. The security display address is a preset fixed display address.

In embodiments, the security display address is the preset fixed display address. For example, the security display address is a physical address of a fixed storage unit. In another example, the security display address is physical address of some fixed storage units. Each physical address of the storage unit may correspond to a respective fixed display region of the display screen. The security processing information may be stored at the fixed display address. That is, when the display screen displays the security processing information, the security processing information may be displayed in the fixed region of the display screen. It should be noted that, after entering the security display control state, the security display address of the display screen is only used to display the security processing information, and the security processing information is displayed in the fixed region of the display screen, such that the user may conveniently confirm that the security processing information is in the security display control state.

In detailed implementations, in a case that the display control module includes a single output path after the filtering based on the specified identifier, the display control module may control the display screen to display the security processing information after obtaining the security processing information, and the other information in the first information to be displayed is not displayed since the other information is discarded in the filtering process. As a result, integrity of displaying the first information to be displayed cannot be ensured. In a case that the display control module includes two output paths after the filtering based on the specified identifier, after the display control module obtains the security processing information, the security processing information and the other information except the security processing information in the first information to be displayed may be combined to obtain processed first information to be displayed, and the display control module controls the display screen to display the processed first information to be displayed, such that all of the first information to be displayed may be completely displayed, thereby ensuring integrity of displaying and ensuring security of displaying.

As a possible implementation of embodiments of the present disclosure, the block S5 may include: adding, by the display control module, a security identifier to the security processing information, and controlling the display screen to display the security processing information and the security identifier at the security display address. With this possible implementation, the security identifier may be configured to inform the user that the data displayed in the region where the security identifier is located is security data, such that the user may conveniently identify the security display address based on the security identifier.

In embodiments, the security identifier may be a unique bank logo, a watermark private to the user, or the like. When the security identifier is the watermark, the display control module may adopt a digital watermarking technology to add the security identifier into the security processing information. The security identifier and the security processing information may be overlapped and displayed at the security display address.

As a possible implementation of embodiments of the present disclosure, after the block S2 and before the block S3, the method according to embodiments may further include: determining, by, the display control module, whether the first information to be displayed includes the security identifier; if yes, discarding the first information to be displayed and sending an error response; otherwise, if no, executing the block S3. With the possible implementation, the information to be displayed which is falsified by a hacker and carries the security identifier may be intercepted to prevent a case caused by the hacker that the user considers the display in the region where the security identifier is located as the security display. A security display region is identified by the security identifier, such that the user may conveniently and visually confirm the security display area.

In embodiments, in a case that the first information to be displayed includes the security identifier, it indicates that the first information to be displayed is faked information. In this case, if the block S3 is continuously performed, the display control module may obtain the faked security processing information included in the first information to be displayed after the filtering and display the information on the display screen after the security identifier is added. Therefore, the user may consider that the displayed information is secure and is not tampered, and thus subsequent operations are performed, causing a loss to the user. Directly discarding the first information to be displayed carrying the security identifier may prevent the display of the faked first information to be displayed.

With the security display method according to embodiments, the security processing information that is securely processed by the security module is same to the security processing information that is displayed on the display screen. In a case that the security processing information is tampered, the user may not confirm the security processing information that is incorrect, since the tampered information is displayed. The tampered security processing information may not be signed as long as the user does not confirm the tampered security processing information, such that a technical problem that "what you see is what you sign" may not be guaranteed existing in the related art may be solved. In addition, the security processing information is displayed at the preset fixed display address, and the user only needs to confirm the information displayed in the region corresponding to the fixed display address, thereby enhancing convenience of confirmation.

As a possible implementation of embodiments of the present disclosure, after the bock S5, the method according to embodiments may further include a block S6. The block S6 may include receiving, by the display control module, a security processing response. The security processing response is configured to indicate a processing result of performing the security processing on the security processing information. After it is determined that the first information to be displayed includes the specified identifier, and before the block S6, the method according to embodiments may further include the following. Second information to be displayed is obtained by the display control module. It is determined whether the second information to be displayed includes the specified identifier. If yes, the second information to be displayed is discarded, the second information to be displayed is used as the first information to be displayed after the block S6 and the block S4 is executed. If no, the display screen is controlled to display the second information to be displayed.

In embodiments, the security processing information of the first information to be displayed is stored in the security module before the display control module receives a processing result indicating that the security processing information in the first information to be displayed is securely processed. In this case, the display control module may continue to receive the second information to be displayed. After the display control module receives the second information to be displayed, the display control module may determine whether the second information to be displayed includes the specified identifier. If yes, it indicates that the second information to be displayed includes information that needs to be securely processed and securely displayed. At this time, the processing on the security processing information in the first information to be displayed is not completely. Therefore, the display control module may discard the second information to be displayed in order to avoid that the processing of the security processing information included in the first information to be displayed is not completely caused by that the security processing information in the first information to be displayed is replaced by the second information to be displayed. In another example, the display control module may store the second information to be displayed. After the block S6, the second information to be displayed may be processed based on the processing, after the block S3, of the first information to be displayed. Therefore, a consistency between the security processing information in the security module and the security processing information displayed on the display screen may be ensured, thereby avoiding that the hacker rapidly sends the second information to be displayed carrying real security processing information after sending the first information to be displayed carrying the tampered security processing information, such that the user considers that the security processing information in the security module is consistent with the information securely displayed to bring loss to loss to the user after the confirmation.

After the security processing information is displayed, the user may confirm the displayed security processing information. As a possible implementation of embodiments of the present disclosure, the display control module may perform a key detection. Different responses may be obtained based on different detection results. For example, three ways may be described below.

In a first way, the security processing response may include a completion response. After the block S5 and before the block S6, the method according to embodiments may further include the following. A confirmation response is sent by the display control module to the security module in response to detecting that a confirmation key is pressed within a preset time. The confirmation response is received by the security module A signature operation is performed on the security processing information, and the completion response is sent to the display control module after the signature operation is completed.

In embodiments, the completion response may carry signature information obtained after the security module signs the security processing information. The display control module may start timing upon controlling the display screen to display the security processing information. The key detection is continuously performed within the preset time. In a case of detecting that the key is pressed, it may be determined which key is pressed based on a key value of the pressed key. The preset time refers to the time for confirming the display information by the user. When the user presses the confirmation key within the preset time, the confirmation may be considered as a valid confirmation operation. In order to further remind the user, a countdown starting from the preset time may be displayed on the display screen to inform the user of the remaining time for the confirmation. In addition, since an existing mobile terminal only has such as a power key, an up key, a down key and the like, but does not have the confirmation key, Therefore, in order to implement a function of the confirmation key, the confirmation key may be added to the mobile terminal, which requires changing a structure of the mobile terminal and increasing a hardware cost. In order to save the hardware cost, an existing key of the existing mobile terminal, for example, an up key or a down key, may be used as the confirmation key within the preset time after the display control module starts the timing.

In a second way, the security processing response may include: a canceling response. After the block S5 and before the block S6, the method according to embodiments may further include the following. A canceling response is generated in response to detecting by the display control module, that a canceling key is pressed within the preset time.

In embodiments, the display control module may start the timing upon controlling the display screen to display the security processing information. The key detection may be continuously performed within the preset time. In response to detecting that the key is pressed, it may be determined which key is pressed by a key value of the pressed key. The preset time may refer to the time for confirming the display information by the user. When the user presses the canceling key within the preset time, the canceling is a valid canceling operation. In order to further remind the user, the countdown starting from the preset time may be displayed on the display screen to inform the user of remaining time for this operation. Further, the canceling key may be implemented with reference to two ways of implementing the confirmation key in the first way.

In a third way, the security processing response may include a timeout response. After the block S5 and before the block S6, the method according to embodiments may further include the followings. The timeout response is generated in a case that no confirmation key or canceling key is pressed within the preset time.

In embodiments, detecting by the display control module, that no confirmation key or no canceling key is pressed within the preset time includes may the following two cases. The display control module detects that other keys except the confirmation key and the canceling key are pressed within the preset time, or the display control module detects that no key is pressed within the preset time.

As a possible implementation of embodiments of the present disclosure, the key detection may be performed by the security module. Based on different detection results, different responses may be obtained in following three ways.

In a first way, the security processing response may include a completion response. After the block S5 and before the block S6, the method according to embodiments may further include the followings. After detecting that the confirmation key is pressed within the preset time, the security module may perform the signature operation on the security processing information, and send the completion response to the display control module after the signature operation is completed.

In embodiments, the security module may state the timing upon controlling, by the display control module, the display screen to display the security processing information. The key detection may be continuously performed within the preset time. In a case of detecting that the key is pressed, it may be determined which key is pressed based on the key value of the pressed key. The preset time may refer to the time for confirming the displayed information by the user. When the user presses the confirmation key within the preset time, the confirmation is a valid confirmation operation. In order to further remind the user, a countdown starting from the preset time may be displayed on the display screen to inform the user of remaining time for the confirmation. In addition, since an existing mobile terminal only has such as a power key, an up key, a down key and the like, but does not have the confirmation key. In order to implement the function of the confirmation key, the confirmation key may be added to the mobile terminal, which requires changing the structure of the mobile terminal and increasing the hardware cost. In order to save the hardware cost, an existing key of the existing mobile terminal, for example the up key or the down key may be reused as the confirmation key within the preset time after the display control module starts the timing.

In a second way, the security processing response may include a canceling response. After the block S5 and before the block S6, the method according to embodiments may further include the followings. A canceling response is generated in response to detecting, by the security module detects that a canceling key is pressed within the preset time and the canceling response is sent to the display control module.

In embodiments, when the display control module controls the display screen to display the security processing information, the security module may start the timing and continue to perform the key detection within a preset time. In a case of detecting that the key is pressed, it may be determined which key is pressed based on the key value of the pressed key. The preset time may refer to the time for confirming the displayed information by the user. When the user presses the canceling key within the preset time, the canceling is may be a valid canceling operation. In order to further remind the user, the countdown starting from the preset time may be displayed on the display screen to inform the user of remaining time for the operation. Further, the canceling key may be implemented with reference to two ways of implementing the confirmation key in the first way.

In a third way, the security processing response may include a timeout response. After the block S5 and before the block S6, the method according to embodiments may further include the followings. A timeout response is generated by the security module and sent to the display control module in response to detecting that no confirmation key or no canceling key is pressed within the preset time.

In embodiments, detecting, by the security module, that no confirmation key or no canceling key is pressed within the preset time may include the following two cases. The security module detects that other keys except the confirmation key and the canceling key are pressed within the preset time, or the security module detects that no key is pressed within the preset time.

As a possible implementation of embodiments of the present disclosure, after the block S6, the method according to embodiments may further include the followings. The security processing response is sent by display control module to the central processing unit. With this possible implementation, the central processing unit may learn about the processing of the security processing information.

In embodiments, in a case that the key detection is performed, after the display control module receives the completion response sent by the security module, or the display control module generates the canceling response, or the display control module generates the timeout response, the display control module may send a corresponding security processing response to the central processing unit. In a case that security detection is performed by the security module performs, the display control module may receive the completion response, the canceling response or the timeout response sent by the security module, and send the corresponding security processing response to the central processing unit. After receiving the security processing response, the central processing unit may send the security processing response to a background server of a bank through network. The background server of the bank may carry out subsequent transaction operations based on the received security processing response.

Figure 2:
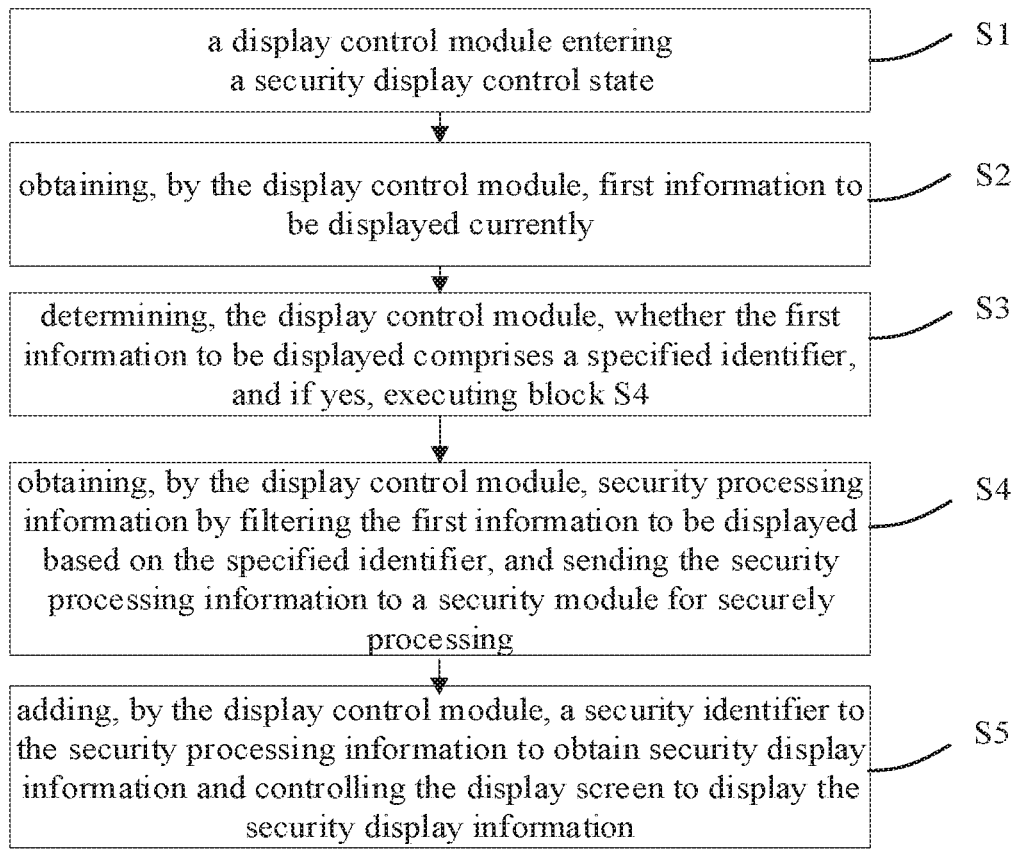
FIG. 2 is a flow chart illustrating a security display method according to embodiments of the present invention.

Embodiments provide another security display method. A difference between the Embodiment 2 and Embodiment 1 is in the block S5 and others are the same to the Embodiment 1, which is not described in detail here. Only the difference will be described below. As illustrated in FIG. 2, the security display method according to embodiments may mainly include the following (blocks S1-S5, where blocks S1-S4 are same to those in Embodiment 1).

At block S1, the display control module enters the security display control state.

At block S2, the display control module obtains first information to be displayed currently.

At block S3, the display control module determines whether the first information to be displayed includes the specified identifier. If yes, the block S4 is executed.

At block S4, the display control module obtains the security processing information by filtering the first information to be displayed based on the specified identifier, and sends the security processing information to the security module for securely processing.

At block S5, the display control module adds a security identifier to the security processing information to obtain security display information and controls the display screen to display the security display information.

In embodiments, the security identifier may be a unique bank logo, a watermark private to the user, or the like. In a case that the security identifier is the watermark, the display control module may adopt a digital watermarking technology to add the security identifier into the security processing information to obtain the security display information. The security identifier and the security processing information may be overlapped and displayed. A display region having the specified identifier is a security display region. The information displayed in the security display region is not attacked and is secure.

As a possible implementation of embodiments of the present disclosure, after the block S2 and before the block S3, the method according to embodiments may further include the followings. It is determined, by the display control module, whether the first information to be displayed includes the security identifier. If yes, the first information to be displayed is discarded and an error response is sent. If no, the block S3 is executed. With this possible implementation, the information to be displayed carrying the security identifier that is falsified by the hacker is intercepted to prevent a case caused by the hacker that the user considers the display in the region where the security identifier is located as the security display.

In embodiments, in a case that the first information to be displayed already includes the security identifier, it indicates that the first information to be displayed is faked information. In this case, if the block S3 is continuously executed, the display control module may obtain faked security processing information included in the first information to be displayed by the filtering and display the information on the display screen after the security identifier is added. Therefore, the user may consider that the displayed information is secure and is not tampered, and thus subsequent operations are performed, causing a loss to the user. Directly discarding the first information to be displayed carrying the security identifier may prevent the display of the faked first information to be displayed.

Figure 3:
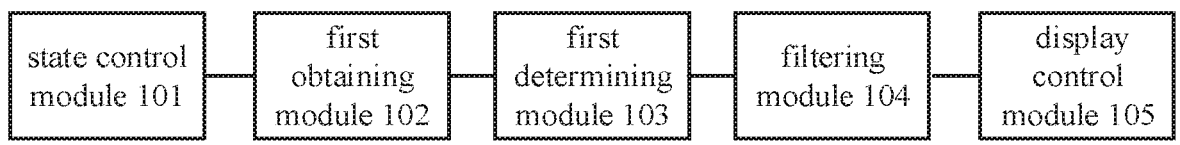
FIG. 3 is a schematic block diagram illustrating a security display device according to embodiments of the present invention.

With the security display method according to embodiments, the security identifier is added to the security processing information included in the first information to be displayed The user is informed, based on the security identifier, of that the displayed information is secure and is not tampered, and the displayed information without the security identifier is probably tampered and insecure attack information, to allow the display security of the information to be displayed. In addition, the security display region is identified based on the security identifier, to enhance display flexibility of the display screen. The security display region may be set as any region on the display screen as required Embodiments provide a security display device. FIG. 3 is a schematic block diagram illustrating a security display device 10 according to embodiments. The security display device in Embodiment 3 may be used to execute the security display method in Embodiment 1. Only the structure of the security display device in Embodiment 3 will be briefly described below, and other contents may refer to related descriptions of the security display method in Embodiment 1.

As illustrated in FIG. 3, the security display device 10 according to embodiments may include a state control module 101, a first obtaining module 102, a first determining module 103, a filtering module 104, a display control module 105. The state control module 101 may be configured to control the security display device 10 to enter a security display control state. The first obtaining module 102 may be configured to obtain first information to be displayed currently. The first determining module 103 may be configured to determine whether the first information to be displayed includes a specified identifier, and if yes, send the first information to be displayed to the filtering module 104. The filtering module 104 may be configured to receive the first information to be displayed, obtain security processing information by filtering the first information to be displayed based on the specified identifier, send the security processing information to a security module connected to the security display device for securely processing, and send the security processing information to the display control module 105. The display control module 105 may be configured to control the display screen to display the security processing information at a security display address. The security display address is a preset fixed display address.

With the security display device according to embodiments, the security processing information that is securely processed by the security module is same to the security processing information that is displayed by the display screen. In a case that the security processing information is tampered, the user may not confirm the security processing information that is incorrect, since the tampered information is displayed. The tampered security processing information may not be signed as long as the user does not confirm the tampered security processing information, such that a technical problem that "what you see is what you sign" may not be guaranteed existing in the related art may be solved. In addition, the security processing information is displayed at the preset fixed display address, and the user only needs to confirm the information displayed in the region corresponding to the fixed display address, thereby enhancing convenience of confirmation.

In embodiments, various modules of the security display device 10 may be integrated on a single chip, to form a separated and secure chip, and all operations of the security display device 10 may be controlled by an internal module thereof, without being controlled by an external control chip (e.g., a central processing unit of the terminal), to guarantee security of operations of the security display device 10. The state control module 101 has a state control function, and may switch states of the security display device 10 based on a trigger of an instruction. In a case that the security display device 10 is in the security display control state, after receiving the information to be displayed, the security display device 10 does not directly send the information to be displayed to a display screen connected to the security display device 10 for display, but a series of judgments and processes are performed on the information to be displayed by modules (e.g., the first determining module 103 and the filtering module 104) of the security display device 10 to determine a display manner based on the type and the timing of the received information to be displayed. Compared with the security display control state of the security display device 10, a non-security display control state of the security display device 10 may be referred to as a general state. In a case that the security display device 10 is in the general state, after the security display device 10 receives the information to be displayed, the display control module 106 may be configured to control the display screen connected to the security display device 10 to directly display the information to be displayed. In detailed implementations, in order to realize different display functions of the security display device 10 in different states, a switch may be set in the security display device 10. In a case that the security display device 10 is in the general state, the switch may be controlled to be in a first switching state. In this case the security display device 10 only has a forwarding function and directly forwards the received data to be displayed to the display screen for displaying. In a case that the security display device 10 is in the security display control state, the switch may be controlled to be in a second switching state. In this case, after the security display device 10 receives the data to be displayed, the data may be processed by the first obtaining module 102, the first determining module 103, the filtering module 104, a security identifier adding module 105, and the display control module 106.

As a possible implementation of embodiments of the present invention, the display control module 105 may include: a security identifier adding unit 1051 and a display control unit 1052. The security identifier adding unit 1051 may be configured to add a security identifier to the security processing information. The display control unit 1052 may be configured to control the display screen to display the security processing information and the security identifier at the security display address. With this possible implementation, the user may conveniently identify the security display address based on the security identifier.

As a possible implementation of embodiments of the present disclosure, the security display device 10 according to embodiments may further include: a first receiving module 106 and a second determining module 107. The first receiving module 106 may be configured to receive a first instruction sent by the central processing unit, and send the first instruction to the second determining module 107. The second determining module 107 may be configured to determine whether the first instruction is included in a security instruction set, and if yes, trigger the state control module 101 to control the security display device 10 to enter the security display control state. The security instruction set may include all instructions for triggering to enter the security display state.

In embodiments, the first obtaining module 102 may be configured to obtain the first information to be displayed from the received control instruction. The control instruction carrying the first information to be displayed and the instruction for triggering the state control module 101 to control the security display device 10 to enter the security display control state may be a same instruction or different instructions. In detailed implementations, based on a determination whether the control instruction is same as the instruction for triggering the security display device 10 to enter the security display control state, the first obtaining module 102 may be obtain the first information to be displayed currently in different ways. For example, two ways may be described below.

In a first way, the instruction for triggering the security display device 10 to enter the security display control state is different from the control instruction carrying the first information to be displayed currently. In this way, the security instruction set may include an application initialization instruction or an instruction for preparing a security computing environment, and the first instruction may include the application initialization instruction or the instruction for preparing the security computing environment. The application initialization instruction or the instruction for preparing the security computing environment may be used to trigger the security display device 10 to enter the security display control state. The first receiving module 106 may be further configured to receive a control instruction, sent by the central processing unit, carrying the first information to be displayed, and send the control instruction to the first obtaining module 102. The first obtaining module 102 may be configured to obtain first information to be displayed currently by obtaining, by the first obtaining module 102, the first information to be displayed carried in the control instruction.

In a second way, the instruction for triggering the security display device 10 to enter the security display control state is same as the control instruction carrying the first information to be displayed currently. That is, in implementations, in a case that the security display device 10 receives a special control instruction for displaying, the security display device 10 may enter the security display control state. In this way, the security instruction set may include a signature instruction, and the first instruction may include the signature instruction. That is, the signature instruction may be used to trigger the security display device 10 to enter the security display control state. The first obtaining module 102 is configured to obtain the first information to be displayed currently by obtaining, by the first obtaining module 102, the first information to be displayed carried in the signature instruction.

Figure 4:
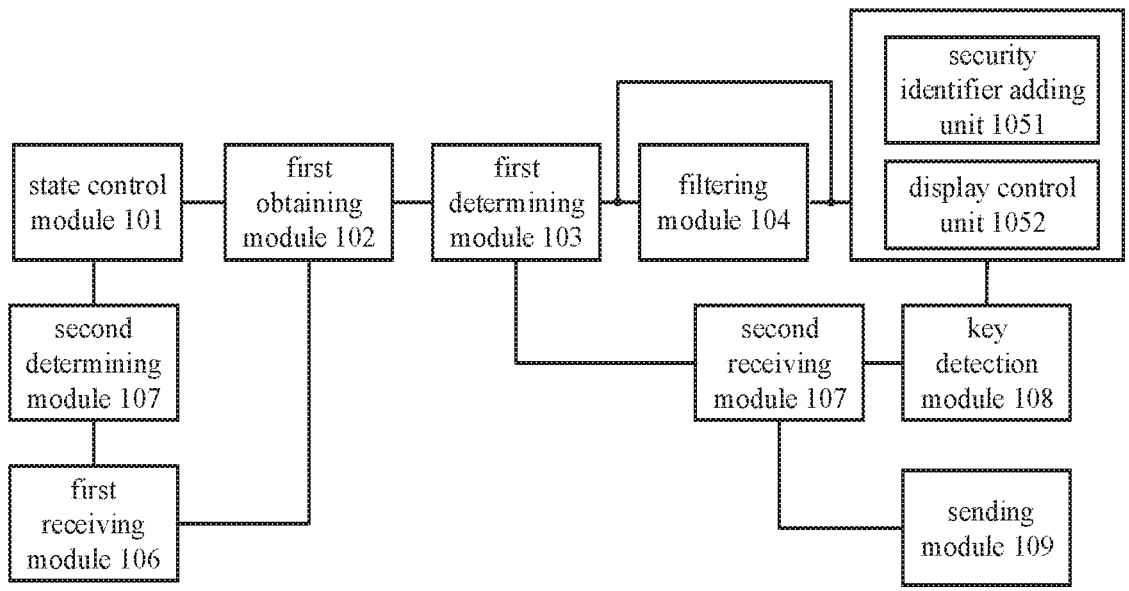
FIG. 4 is a schematic block diagram illustrating a security display device according to embodiments of the present invention.

As a possible implementation of embodiments of the present disclosure, as illustrated in FIG. 4, the security display device 10 according to embodiments may further include: a second receiving module 107. The second receiving module 107 may be configured to receive a security processing response after the display control module 106 controls the display screen to display the security processing information. The security processing response may be configured to indicate a processing result of performing the security processing on the security processing information. The first obtaining module 102 may be further configured to obtain second information to be displayed after the first determining module 103 determines that the first information to be displayed includes a specified identifier and before the second receiving module 107 receives the security processing response. The first determining module 103 may be further configured to receive the second information to be displayed, determine whether the second information to be displayed includes the specified identifier, if yes, discard the second information to be displayed, or after the second receiving module 107 receives the security processing response, use the second information to be displayed as the first information to be displayed, and send the first information to be displayed to the filtering module 104. Otherwise, if no, the first determining module 103 may be further configured to send the second information to be displayed to the display control module 105. The display control module 105 may be configured to control the display screen to display the second information to be displayed.

With this possible implementation, consistency between the security processing information in the security module and the security processing information displayed on the display screen may be ensured, thereby avoiding that the hacker rapidly sends the second information to be displayed carrying real security processing information after sending the first information to be displayed carrying the tampered security processing information such that the user considers that the security processing information in the security module is consistent with the information securely displayed to bring loss to the user after the confirmation.

After the security process information is displayed, the user may confirm the displayed security process information and key detection may be performed by the security display device 10. Therefore, as a possible implementation of embodiments of the present disclosure, the security processing response may include a completion response, a canceling response or a timeout response. The security display device 10 according to embodiments may further include a key detection module 108. The key detection module 108 may be configured to perform the key detection after the display control module 105 controls the display screen to display the security processing information and before the second receiving module receives the security processing response. The key detection module 108 may be further configured to generate a confirmation response in response to detecting that a confirmation key is pressed within the preset time, send the confirmation response to the security module, and receive the completion response sent by the security module. Furthermore, the key detection module 108 may be further configured to generate a canceling response in response to detecting that a canceling key is processed within the preset time, otherwise, in response to detecting that a canceling key is not processed within the preset time generate a timeout response.

As a possible implementation of embodiments of the present disclosure, as illustrated in FIG. 4, the security display device 10 according to embodiments may further include a sending module 109. The sending module 109 may be configured to send the security processing response to the central processing unit. With this possible implementation, the central processing unit may be configured to learn a processing result of the security processing information.

Figure 5:
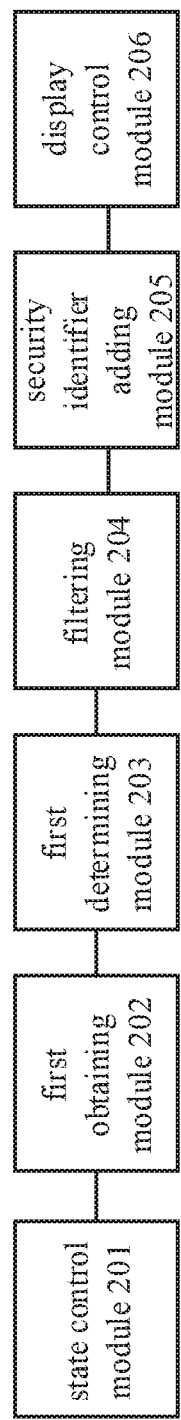
FIG. 5 is a schematic block diagram illustrating a security display device according to embodiments of the present invention.

Embodiments provide another security display device. FIG. 5 is a schematic block diagram illustrating a security display device 20 according to embodiments. The security display device in Embodiment 4 may be configured to execute the security display method in Embodiment 2. Only the structure of the security display device in Embodiment 4 will be briefly described below, and others may refer to related descriptions of the security display methods in Embodiment 1 and Embodiment 2.

As illustrated in FIG. 5, the security display device 20 according to embodiments may include a state control module 201, a first obtaining module 202, a first determining module 203, a filtering module 204, a security identifier adding module 205, and a display control module 206. The state control module 201 may be configured to control the security display device to enter a security display control state. The first obtaining module 202 may be configured to obtain first information to be displayed currently. The first determining module 203 may be configured to determine whether the first information to be displayed includes a specified identifier, and if yes, send the first information to be displayed to the filtering module 204. The filtering module 204 may be configured to receive the first information to be displayed, obtain security processing information by filtering the first information to be displayed based on the specified identifier, send the security processing information to a security module connected to the security display device for securely processing, and send the security processing information to the security identifier adding module. The security identifier adding module 205 may be configured to add a security identifier to the security processing information to obtain the security display information. The display control module 206 may be configured to control the display screen to display the security display information.

With the security display device according to embodiments, the security processing information carried in the first information to be displayed may be obtained after the filtering. The security identifier may be added to the security processing information. Therefore, the user may be informed of that the information displayed is secure and not tampered based on the security identifier, while the displayed information without the security identifier is tampered and insecure, thereby ensuring security of displaying the information to be displayed.

Figure 6:
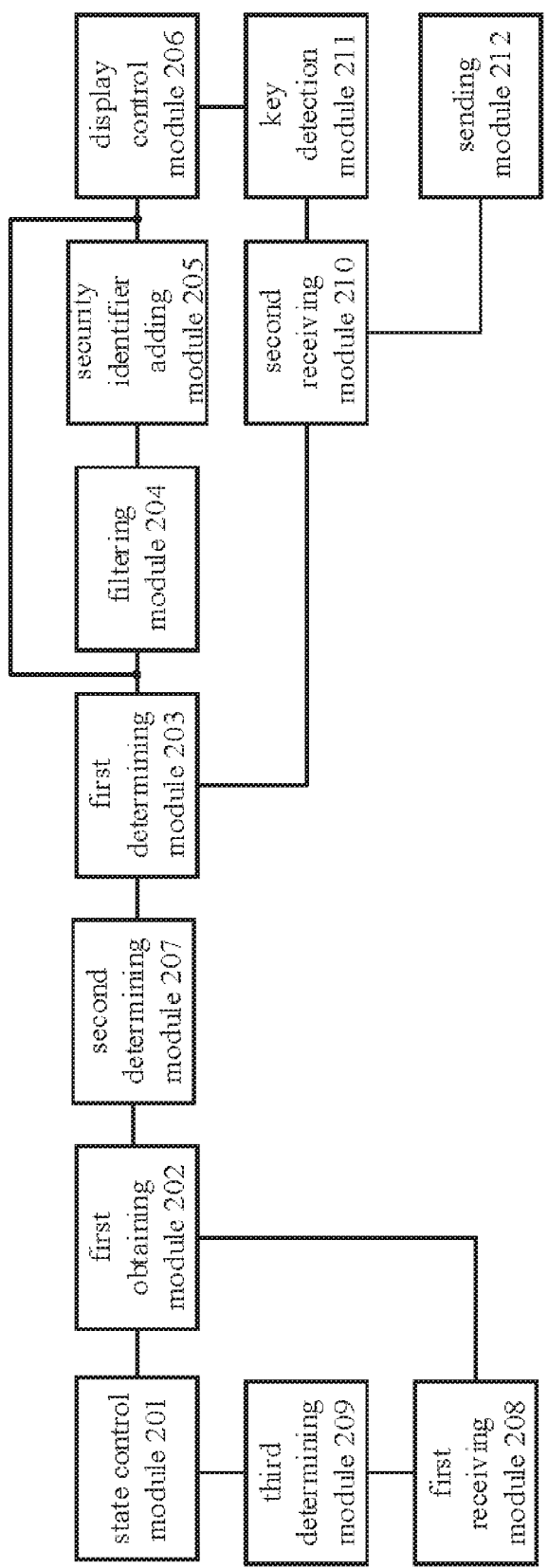
FIG. 6 is a schematic block diagram illustrating a security display device according to embodiments of the present invention.

As a possible implementation of embodiments of the present disclosure, as illustrated in FIG. 6, the security display device 20 according to embodiments may further include a second determining module 207. The second determining module 207 may be configured to determine whether the first information to be displayed includes the security identifier before the first determining module 201 determines whether the first information to be displayed includes the specified identifier; if yes, discard the first information to be displayed and send an error response, otherwise, if no, send the first information to be displayed to the first determining module 201 for processing. With this possible implementation, the information to be displayed which is falsified by the hacker and carries the security identifier may be intercepted, to prevent a case caused by the hacker that the user consider the display of the region where the security identifier is positioned as the security display based on the security identifier.

As a possible implementation of embodiments of the present invention, as illustrated in FIG. 6, the security display device 20 according to embodiments may further include a first receiving module 208 and a third determining module 209. The first receiving module 208 may be configured to receive the first instruction sent by the central processing unit, and send the first instruction to the third determining module 209. The third determining module 209 may be configured to determine whether the first instruction is included in the security instruction set, and if yes, trigger the state control module 201 to control the security display device 20 to enter the security display control state. The security instruction set may include all instructions for triggering to enter the security display state. With this possible implementation, the security display device 20 may be controlled to enter the security display control state by sending an instruction included in the security instruction set in a case of requiring the security display.

In embodiments, the first obtaining module 202 may be configured to obtain the first information to be displayed from the received control instruction. The control instruction carrying the first information to be displayed and the instruction for triggering the state control module 201 to control the security display device 20 to enter the security display control state may be the same instruction or different instructions. In detailed implementations, based on a determination whether the control instruction is same to the instruction for triggering the security display device 20 to enter the security display control state, the first obtaining module 202 may be configured to obtain the first information to be displayed currently in different ways. Two ways may be described below.

In a first way, the instruction for triggering the security display device 20 to enter the security display control state is different from the control instruction carrying the first information to be displayed currently. In this way, the security instruction set may include the application initialization instruction or the instruction for preparing security computing environment, and the first instruction may include the application initialization instruction or the instruction for preparing security computing environment. The application initialization instruction or the instruction for preparing security computing environment may be used to trigger the security display device 20 to enter the security display control state. The first receiving module 208 may be further configured to receive the control instruction, sent by the central processing unit, carrying the first information to be displayed and send the control instruction to the first obtaining module 202. The first obtaining module 202 may be configured to obtain the first information to be displayed currently by obtaining, by the first obtaining module 202, the first information to be displayed carried in the control instruction.

In a second way, the instruction for triggering the security display device 20 to enter the security display control state may be same to the control instruction carrying the first information to be displayed currently. That is, in this implementation in a case that the security display device 20 receives a special control instruction for displaying, the security display device 20 may enter the security display control state. In this way, the security instruction set may include a signature instruction, and the first instruction may include the signature instruction. That is, the signature instruction may be used to trigger the security display device 20 to enter the security display control state. The first obtaining module 202 may be configured to obtain first information to be displayed currently by obtaining, by the first obtaining module 202, the first information to be displayed carried in the signature instruction.

As a possible implementation of embodiments of the present disclosure, as illustrated in FIG. 6, the security display device 20 according to embodiments may further include a second receiving module 210. The second receiving module 210 may be configured to receive the security processing response after the display control module 206 controls the display screen to display the security display information. The security processing response may be used to indicate a processing result of performing the security processing on the security processing information. The first obtaining module 202 may be further configured to obtain the second information to be displayed after the first determining module 203 determines that the first information to be displayed includes the specified identifier and before the second receiving module 210 receives the security processing response. The first determining module 203 may be further configured to receive the second information to be displayed, determine whether the second information to be displayed includes the specified identifier, if yes, discard the second information to be displayed or after the second receiving module 210 receives the security processing response, use the second information to be displayed as the first information to be displayed, and send the first information to be displayed to the filtering module 204. Otherwise, if no, the first determining module 203 may be further configured to send the second information to be displayed to the display control module 206. The display control module 206 may be configured to control the display screen to display the second information to be displayed.

With this possible implementation, consistency between the security processing information that is securely processed and the security processing information that is displayed on the display screen may be ensured, to prevent a case that the hacker rapidly sends the second information to be displayed carrying real security processing information after sending the first information to be displayed carrying the tampered security processing information such that the user considers that the security processing information in the security module is consistent with the information securely displayed to bring loss to the user after the confirmation.

After the security display information is displayed, the user may confirm the displayed security display information and the key detection may be performed by the security display device 20. Therefore, as a possible implementation of embodiments of the present disclosure, the security processing response may include the completion response, the canceling response or the timeout response. The security display device 20 according to embodiments may further include a key detection module 111. The key detection module 111 may be configured to perform the key detection after the display control module 206 controls the display screen to display the security display information and before the second receiving module receives the security processing response. In addition, the key detection module 111 is configured to generate the confirmation response in response to detecting that the confirmation key is pressed within the preset time, send the confirmation response to the security module, receive the completing response sent by the security module; generate the canceling response in response to detecting that the canceling key is pressed within the preset time; otherwise, in response to detecting that the canceling key is not pressed within the preset time generate the timeout response.

As a possible implementation of embodiments of the present disclosure, as illustrated in FIG. 6, the security display device 20 according to embodiments may further include a sending module 212. The sending module 212 may be configured to send the security processing response to the central processing unit. With this possible implementation, the central processing unit may learn the processing result of the security processing information.

Embodiments also provide a security terminal.

The security terminal may include one or more processors, a memory, and one or more programs stored in the memory. When the one or more programs are executed by the one or more processors, followings may be executed.

The display control module enters a security display control state. First information to be displayed currently is obtained. It is determined whether the first information to be displayed includes a specified identifier. In response to the first information to be displayed includes the specified identifier, security processing information is obtained by filtering the first information to be displayed based on the specified identifier, and the security processing information is sent to the security module for security processing. The display screen is controlled to display security processing information at a security display address, or the security identifier is added to the security processing information to obtain the security display information, and the display screen is controlled to display the security display information. The security display address is a preset fixed display address.

Although embodiments of the present invention have been shown and described above, it will be understood that the above embodiments are exemplary and not to be construed as limiting the present invention, and that those skilled in the art may make variations, modifications, substitutions and alterations within the scope of the present invention without departing from the spirit and scope of the present invention. The scope of the present invention is defined by the appended claims and equivalents thereof.

What is claimed is:

1. A security display method, comprising:
receiving a first instruction sent by a central processing unit;
determining whether the first instruction is comprised in a security instruction set, in which the security instruction set comprises all instructions for triggering to enter a security display control state;
entering the security display control state in response to the first instruction comprised in the security instruction set;
obtaining first information to be displayed currently;
determining whether the first information to be displayed comprises a specified identifier;
in response to the first information to be displayed comprises the specified identifier, obtaining security processing information by filtering the first information to be displayed based on the specified identifier, and securely processing the security processing information; and
controlling to display the security processing information at a security display address, wherein the security display address is a preset fixed display address; or adding a security identifier to the security processing information to obtain security display information and controlling to display the security display information;
wherein in response to adding the security identifier to the security processing information and controlling to display the security processing information, after obtaining first information to be displayed currently and before determining whether the first information to be displayed comprises a specified identifier, the method further comprises:
determining whether the first information to be displayed comprises the security identifier;
in response to the first information to be displayed comprises the security identifier, discarding the first information to be displayed and sending an error response; and in response to the first information to be displayed does not comprise the security identifier, determining whether the first information to be displayed comprises the specified identifier.

2. The method of claim 1, wherein the controlling to display the security processing information at the security display address comprises:
adding a security identifier to the security processing information and controlling to display the security processing information and the security identifier at the security display address.

3. The method of claim 1, wherein the first instruction comprises an application initialization instruction or an instruction for preparing security computing environment; and
obtaining the first information to be displayed currently comprises: receiving a control instruction carrying the first information to be displayed and obtaining the first information to be displayed carried in the control instruction.

4. The method of claim 1, wherein the first instruction comprises a signature instruction; and
obtaining first information to be displayed currently comprises:
obtaining the first information to be displayed carried in the signature instruction.

5. The method of claim 1, wherein the method further comprises:
receiving a security processing response, in which the security processing response is configured to indicate a processing result of performing security processing on the security processing information;
after determining that the first information to be displayed comprises the specified identifier, and before receiving the security processing response,
obtaining second information to be displayed and determining whether the second information to be displayed comprises the specified identifier;
in response to the second information to be displayed comprises the specified identifier, discarding the second information to be displayed;
or after receiving the security processing response, using the second information to be displayed as the first information to be displayed and obtaining the security processing information by filtering the first information to be displayed based on the specified identifier and securely processing the security processing information;
in response to the second information to be displayed does not comprise the specified identifier, controlling the display screen to display the second information to be displayed.

6. The method of claim 5, wherein,
the security processing response comprises a completion response;
and the method further comprises:
generating a confirmation response, in response to detecting that a confirmation key is pressed within a preset time;
performing a signature operation on the security processing information, and controlling to display the security processing information after the signature operation is completed;
or,
the security processing response comprises a canceling response; and the method further comprises: in response to detecting that a canceling key is pressed within the preset time, generating the canceling response;
or,
the security processing response comprises a timeout response; and the method further comprises: generating the timeout response in response to detecting that no confirmation key or no cancel key is pressed within the preset time.

7. The method of claim 5, wherein the method further comprises:
sending the security processing response to a central processing unit.

8. A security terminal, comprising:
one or more processors;
a memory;
one or more programs, stored in the memory, that when executed by the one or more processors performs a security display method comprising:
receiving a first instruction sent by a central processing unit;
determining whether the first instruction is comprised in a security instruction set, in which the security instruction set comprises all instructions for triggering to enter a security display control state;

entering the security display control state in response to the first instruction comprised in the security instruction set;

obtaining first information to be displayed currently;

determining whether the first information to be displayed comprises a specified identifier;

in response to the first information to be displayed comprises the specified identifier, obtaining security processing information by filtering the first information to be displayed based on the specified identifier, and securely processing the security processing information; and controlling to display the security processing information at a security display address, in which the security display address is a preset fixed display address; or, adding a specified identifier to the security processing information to obtain security display information and controlling to display the security display information;

wherein in response to adding the security identifier to the security processing information and controlling to display the security processing information, after obtaining first information to be displayed currently and before determining whether the first information to be displayed comprises a specified identifier, the method further comprises:

determining whether the first information to be displayed comprises the security identifier;

in response to the first information to be displayed comprises the security identifier, discarding the first information to be displayed and sending an error response; and in response to the first information to be displayed does not comprise the security identifier, determining whether the first information to be displayed comprises the specified identifier.

9. The security terminal of claim 8, wherein controlling to display the security processing information at the security display address comprises:

adding a security identifier to the security processing information and controlling to display the security processing information and the security identifier at the security display address.

10. The security terminal of claim 8, wherein before entering the security display control state, the method further comprises:

receiving a first instruction sent by a central processing unit;

determining whether the first instruction is comprised in a security instruction set, in which the security instruction set comprises all instructions for triggering to enter the security display control state;

in response to the first instruction is comprised in the security instruction set, entering the security display control state.

11. The security terminal of claim 10, wherein the first instruction comprises an application initialization instruction or an instruction for preparing security computing environment;

obtaining the first information to be displayed currently comprises:

receiving a control instruction carrying the first information to be displayed and obtaining the first information to be displayed carried in the control instruction.

12. The security terminal of claim 10, wherein the first instruction comprises a signature instruction; and obtaining first information to be displayed currently comprises:

obtaining the first information to be displayed carried in the signature instruction.

13. The security terminal of claim 8, wherein the method further comprises:

receiving a security processing response, in which the security processing response is configured to indicate a processing result of performing security processing on the security processing information;

after determining that the first information to be displayed comprises the specified identifier, and before receiving the security processing response, obtaining second information to be displayed and determining whether the second information to be displayed comprises the specified identifier;

in response to the second information to be displayed comprises the specified identifier, discarding the second information to be displayed;

or after receiving the security processing response, using the second information to be displayed as the first information to be displayed and obtaining the security processing information by filtering the first information to be displayed based on the specified identifier and securely processing the security processing information;

in response to the second information to be displayed does not comprise the specified identifier, controlling the display screen to display the second information to be displayed.

14. The security terminal of claim 13, wherein, the security processing response comprises a completion response; and the method further comprises: generating a confirmation response, in response to detecting that a confirmation key is pressed within a preset time; performing a signature operation on the security processing information, and controlling to display the security processing information after the signature operation is completed;

or, the security processing response comprises a canceling response; and the method further comprises: in response to detecting that a canceling key is pressed within the preset time, generating the canceling response;

or, the security processing response comprises a timeout response; and the method further comprises: generating the timeout response in response to detecting that no confirmation key or no cancel key is pressed within the preset time.

15. The security terminal of claim 13, wherein, the method further comprises: sending the security processing response to a central processing unit.

* * * * *